United States Patent
Karaoguz et al.

(10) Patent No.: US 9,025,534 B2
(45) Date of Patent: May 5, 2015

(54) HYBRID NETWORK CONTROLLER FOR FEMTOCELLS AND ACCESS POINTS

(75) Inventors: Jeyhan Karaoguz, Irvine, CA (US); Nambirajan Seshadri, Irvine, CA (US); Nicholas Ilyadis, Merrimack, NH (US)

(73) Assignee: Broadcom Corporation, Irvine, CA (US)

( * ) Notice: Subject to any disclaimer, the term of this patent is extended or adjusted under 35 U.S.C. 154(b) by 845 days.

(21) Appl. No.: 12/470,764

(22) Filed: May 22, 2009

(65) Prior Publication Data
US 2010/0296497 A1 Nov. 25, 2010

(51) Int. Cl.
H04W 84/04 (2009.01)
H04W 28/16 (2009.01)
H04W 88/08 (2009.01)
H04W 88/12 (2009.01)

(52) U.S. Cl.
CPC ............ H04W 28/16 (2013.01); H04W 84/045 (2013.01); H04W 88/08 (2013.01); H04W 88/12 (2013.01)

(58) Field of Classification Search
CPC .................................................. H04W 84/045
See application file for complete search history.

(56) References Cited

U.S. PATENT DOCUMENTS

| | | | |
|---|---|---|---|
| 8,150,397 B2 * | 4/2012 | Khetawat et al. ............. 455/436 |
| 2007/0183427 A1 * | 8/2007 | Nylander et al. .......... 370/395.2 |
| 2009/0046665 A1 | 2/2009 | Robson et al. |
| 2009/0097448 A1 | 4/2009 | Vasudevan et al. |
| 2009/0156213 A1 * | 6/2009 | Spinelli et al. ................ 455/436 |
| 2009/0170520 A1 | 7/2009 | Jones |
| 2009/0253421 A1 | 10/2009 | Camp, Jr. et al. |
| 2009/0258644 A1 * | 10/2009 | Osborn ....................... 455/432.1 |
| 2009/0274104 A1 | 11/2009 | Addy |
| 2009/0280820 A1 * | 11/2009 | Nakahara ....................... 455/450 |
| 2009/0286510 A1 | 11/2009 | Huber et al. |
| 2009/0316649 A1 | 12/2009 | Chen |
| 2010/0016022 A1 | 1/2010 | Liu et al. |
| 2010/0113006 A1 | 5/2010 | Pajjuri et al. |
| 2010/0118842 A1 | 5/2010 | Kalhan |
| 2010/0118844 A1 | 5/2010 | Jiao et al. |
| 2010/0189084 A1 | 7/2010 | Chen et al. |
| 2010/0214939 A1 * | 8/2010 | Ryan ............................ 370/252 |
| 2010/0214977 A1 * | 8/2010 | Hegde ........................... 370/328 |
| 2010/0246482 A1 | 9/2010 | Erceg et al. |
| 2010/0246483 A1 | 9/2010 | Erceg et al. |
| 2010/0254357 A1 | 10/2010 | Abraham et al. |
| 2010/0296401 A1 | 11/2010 | Karaoguz et al. |
| 2010/0296487 A1 | 11/2010 | Karaoguz et al. |
| 2010/0296498 A1 | 11/2010 | Karaoguz et al. |
| 2010/0296499 A1 | 11/2010 | Karaoguz et al. |

* cited by examiner

*Primary Examiner* — Jianye Wu (74) *Attorney, Agent, or Firm* — Sterne, Kessler, Goldstein & Fox P.L.L.C.

(57) ABSTRACT

A communication system may comprise a hybrid network controller, femtocells, access points and/or endpoint devices. The hybrid network controller may control communication of information between two or more specified femtocells, access points and/or endpoint devices by communicating control information. The communication of information via the femtocells, access points may be managed by the hybrid network controller. The network controller may handle network traffic associated with the communication of the information. The hybrid network controller may control one or more wired and/or wireless interfaces for handling of the network traffic. Quality of service and/or bandwidth allocation may be managed by the hybrid network controller. Resources utilized by the endpoint devices, the femtocells and/or the access points may be allocated and/or de-allocated by the network controller.

21 Claims, 7 Drawing Sheets

FIG. 2

HYBRID NETWORK CONTROLLER FOR FEMTOCELLS AND ACCESS POINTS

CROSS-REFERENCE TO RELATED APPLICATIONS/INCORPORATION BY REFERENCE

This patent application makes reference to:
U.S. patent application Ser. No. 12/470,772 filed on May 22, 2009; U.S. patent application Ser. No. 12/470,826 filed on May 22, 2009; U.S. patent application Ser. No. 12/470,997 filed on May 22, 2009; and U.S. patent application Ser. No. 12/470,983 filed on May 22, 2009.

Each of the above stated applications is hereby incorporated herein by reference in its entirety.

FIELD OF THE INVENTION

Certain embodiments of the invention relate to communications. More specifically, certain embodiments of the invention relate to a method and system for a hybrid network controller for femtocells and access points.

BACKGROUND OF THE INVENTION

An access point is a device that may be placed in a customer's residence or in a business environment, for example, and may provide WLAN or WiFi service. An access point may be enabled to connect an endpoint device such as a computer or handheld wireless device to an intranet or an internet service provider (ISP) via a physical broadband connection which may be, for example, a digital subscriber line (DSL) connection and/or a cable connection. Access points may communicate in adherence to one or more 802.11 standards. Moreover, access points may be attached to an Enterprise network to allow users to access a corporate intranet.

Similar to access points, femtocells may be placed in a customer's residence or in a small business environment as well. Femtocells may be utilized for off-loading macro radio network traffic, improving coverage locally in a cost-effective manner, and/or implementing home-zone services to increase revenue. Femtocells, like macro cell base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data traffic, for example.

An important characteristic of femtocells is their ability to control access. In an open access scenario, any terminal and/or subscriber may be allowed to communicate with the femtocell. Accordingly, the femtocell usage may somewhat resemble that of a macrocell system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a low power in a controlled environment. An additional regulatory issue may arise from the relationship between a femtocell operator and a broadband services operator. There may even be instances when a broadband operator may be unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocell networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a hybrid network controller for femtocells and access points, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a hybrid network controller for femtocells and access points. A communication system may comprise a hybrid network controller, one or more femtocells, one or more access points and one or more endpoint devices. The access points may comprise 2G, 3G and/or 4G technology. For example, the access points may comprise WLAN access points, LTE access points and/or WiMax access points. The hybrid network controller may be communicatively coupled with the one or more femtocells and/or the one or more access points. In addition, the hybrid network controller may be operable to control communication of information between two or more of the femtocells, the access points and the endpoint devices. In this regard, the hybrid network controller may communicate control information to the one or more endpoint devices, the one or more femtocells and/or the one or more access points to enable the communication of information. For example, the hybrid network controller may enable a specified femtocell and/or access point for communication of the information based on the communicated control information. Furthermore, the hybrid network controller may manage the one or more femtocells and/or the one or more access points. The hybrid network controller may be operable to manage the communication of information via one or more of the femtocells and/or via the one or more of the access points. In various embodiments of the invention, the hybrid network controller may be operable to handle network traffic associated with the communication of the information between two or more of the endpoint devices, the femtocells and/or the access points. Moreover, the hybrid network controller may be operable to control one or more wired and/or wireless interfaces for handling of the network traffic. Quality of service and/or bandwidth allocation may be managed by the hybrid network controller. In addition, resources utilized by the endpoint devices, the femtocells and/or the access points for communication of the information may be allocated and/or de-allocated by the hybrid network controller. The hybrid network controller may also be coupled to one or more WiMax access points and/or LTE access points, for example, and may be operable to control and/or manage traffic for the WiMax and/or LTE access points.

Figure 1A:
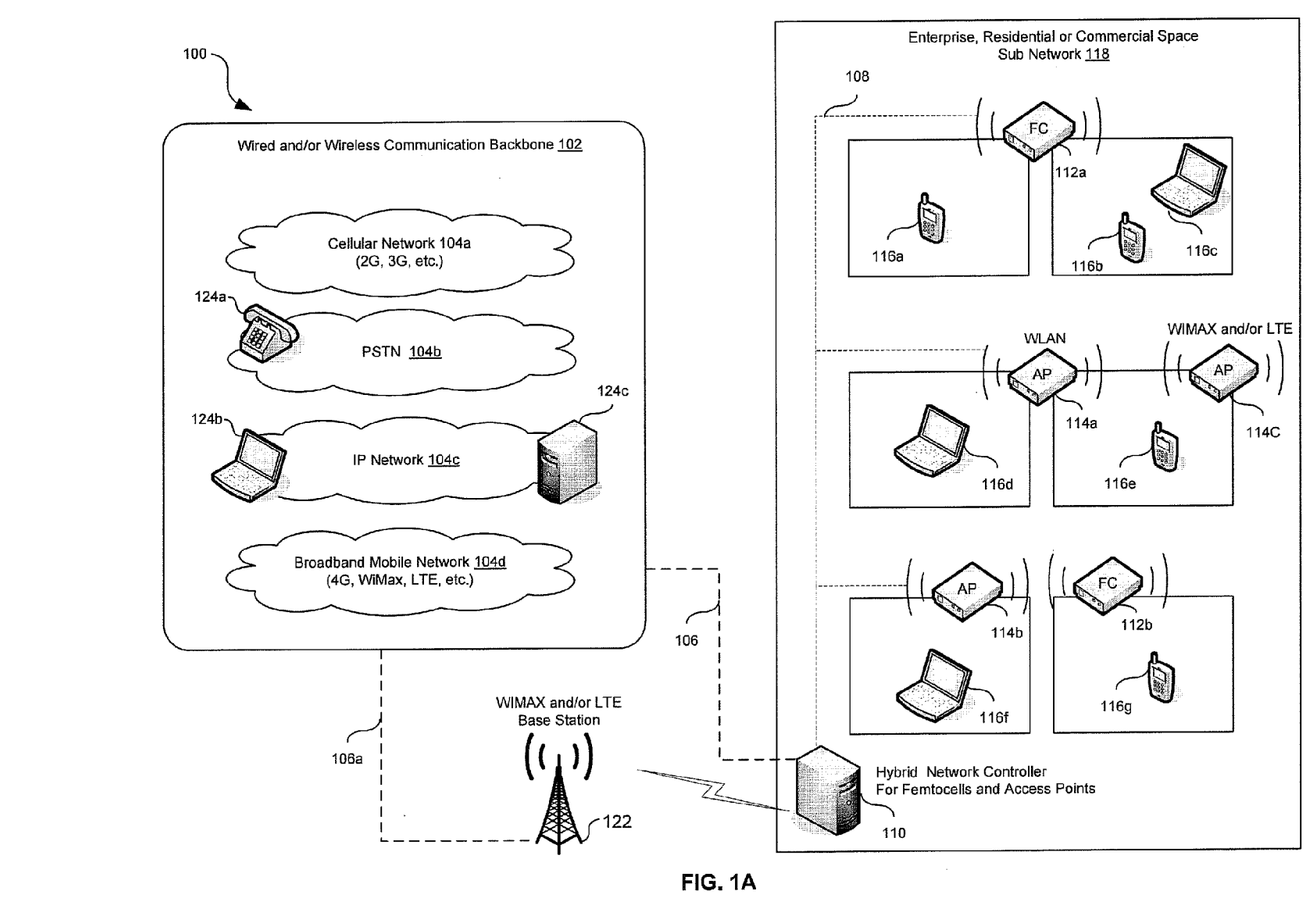
FIG. 1A is a diagram illustrating an exemplary hybrid network comprising femtocells and access points, in accordance with an embodiment of the invention.

FIG. 1A is a diagram illustrating an exemplary hybrid network comprising femtocells and access points, in accordance with an embodiment of the invention. Referring to FIG. 1A, there is shown a system of networks 100 comprising the wired and/or wireless communication backbone 102 which comprises the cellular network 104a, the public switched telephone network 104b, the IP network 104c, the broadband mobile network 104d, the WiMax or LTE base station 122, the telephone 124a, the laptop 124b, the application server 124c and a hybrid sub-network 118. The hybrid sub-network 118 comprises the hybrid network controller 110, a plurality of femtocells 112a and 112b that are collectively referred to herein as femtocells 112, a plurality of access points (AP) 114a, 114b and 114c that are collectively referred to herein as APs 114, and a plurality of end user equipment (UE) 116a . . . 116g that are collectively referred to herein as UEs 116. In addition, the hybrid sub-network 118 comprises a wired and/or wireless connection 108 and an Ethernet, WiMax or LTE broadband link 106.

The hybrid sub-network 118 may comprise a hybrid network controller 110, user equipment (UE) 116a . . . 116g, femtocells 112a and 112b and/or access points (AP) 114a and 114b that may be installed in an enterprise system, commercial properties, residential properties and/or multi-tenant properties for example. The enterprise system may be deployed in office buildings, schools, hospitals or government buildings, for example. The commercial properties may comprise, for example, stores, restaurants and/or offices. The residential properties may comprise, for example, single-family homes, home offices, and/or town-houses. Multi-tenant properties may comprise residential and/or commercial tenants such as apartments, condos, hotels, and/or high rises. In various embodiments of the invention, the hybrid sub-network 118 may be controlled by the hybrid network controller 110. In addition, all or a portion of the hybrid sub-network 118 may be managed by a service provider which licenses cellular frequencies utilized by the hybrid network controller 110 and/or femtocells 112.

The hybrid network controller 110 comprises suitable logic, circuitry and/or code that may be operable to control and/or manage various operational aspects of the hybrid sub-network 118. For example, the hybrid network controller 110 may manage communication and/or quality of service (QoS) for traffic transported by the Ethernet, WiMax and/or LTE broad band link 106 that connects the hybrid sub-network 118 with the wired and/or wireless communication backbone 102. In addition, the hybrid network controller 110 may control one or more aspects of communication among the femtocells 112 and APs 114. For example, load balancing, authentication and/or security management, call and/or session initiation, call and/or session processing, resource allocation and mobility management between femtocells 112 and/or APs 114 may be managed by the hybrid network controller 110. In addition, the hybrid network controller 110 may limit or control access and/or handoffs to femtocells and/or APs in other sub networks and/or to macrocell base stations for example. The hybrid network controller 110 may be communicatively coupled to the femtocells 112 and/or the APs 114 via a wired and/or wireless connection 108. In this regard, the connection 108 may support Ethernet, WLAN and/or cellular connectivity. In addition, the hybrid network controller 110 may be communicatively coupled to the wired and/or wireless communication backbone 102 via the Ethernet, WiMax and/or LTE broad band link 106. For example, the hybrid network controller 110 may communicate with one or more of the networks 104 via the Ethernet, WiMax and/or LTE broad band link 106, for example.

The femtocells 112 may each comprise suitable logic, circuitry, and/or code that may be operable to communicate wirelessly with the UEs 116 utilizing one or more cellular standards comprising IS-95, CDMA, GSM, TDMA, GPRS, EDGE, UMTS/WCDMA, TD-SCDMA, HSDPA, extensions thereto, and/or variants thereof. Data comprises any analog and/or digital information including but not limited to voice, Internet data, and/or multimedia content. Multimedia content may comprise audio and/or visual content comprising, video, still images, animated images, and/or textual content. The femtocells 112 may each communicate with various devices such as the UEs 116. Exemplary cellular standards supported by the femtocells 112 may be specified in the International Mobile Telecommunications-2000 (IMT-2000) standard and/or may, for example be developed by the 3rd generation partnership project (3GPP), the 3rd generation partnership project 2 (3GPP2) and/or fourth generation specifications. Additionally, the femtocells 112 may each comprise suitable logic, circuitry, and/or code that may be operable to communicate utilizing IP protocol over a wired or wireless connection 108 with the hybrid network controller 110.

The APs 114 comprise suitable logic, circuitry and/or code that may be operable to provide WLAN, WiFi, LTE and/or WiMax connectivity to one or more of the UEs 116 devices based on 802.11 standards, for example. For example, the APs 114 may provide Internet connectivity, multimedia downloads and/or IP telephony sessions to the UEs 116. The APs 114 may be managed by the hybrid network controller 110 via the wired and/or wireless connection 108. A plurality of APs 114 may be operable to support simultaneous sessions and/or handoffs of a single UE 116 device. In addition, one or more APs 114 may be operable to support simultaneous sessions and/or handoffs for a single UE 116 with one or more femtocells 112. In various embodiments of the invention, the APs 114 may be operable to support handoff or simultaneous sessions of a single UE 116 with an AP in another sub network (not shown).

The user equipment (UE) 116 may each comprise suitable logic, circuitry, and/or code that may be operable to communicate utilizing one or more wireless standards. For example, the UEs 116 may be operable to communicate with the APs 114 based on 802.11 standards and/or variants thereof. In addition, the UEs 116 may be operable to communicate with the femtocells 112 based on one or more wireless standards such as IS-95, CDMA, EVDO, GSM, TDMA, GPRS, EDGE, UMTS/WCDMA, TD-SCDMA, HSDPA, WiMax and/or LTE. In addition, the UEs 116 may be operable to communicate based on Bluetooth, Zigbee and/or other wireless technologies. The UEs 116 may each be operable to transmit and/or receive data femtocells 112 and/or APs 114 in the hybrid sub-network 118 as well as with other cellular base stations and/or APs. Exemplary UEs 116 may comprise laptop computers, mobile phones, media players, video and/or still cameras, game consoles and/or location determination enabled devices. The UEs 116 may be enabled to receive, process, and present multimedia content and may additionally be enabled to run a web browser or other applications for providing Internet services to a user of the UEs 116.

In various embodiments of the invention, the UEs 116 devices may be multimode devices that may be operable to communicate simultaneously with a plurality of femtocells 112 and/or APs 114. For example, the UEs 116b may be enabled to communicate simultaneously with the femtocell 112a and the AP 114a. Alternatively, the UEs 116 devices may be enabled to communicate simultaneously with a plurality of femtocells 112 or simultaneously with a plurality of APs 114. Moreover, the UEs 116 devices may be operable to perform handoffs, for example, between multiple femtocells 112, between femtocells 112 and APs 114 and/or between multiple APs 114.

The wired and/or wireless communication backbone 102 may comprise suitable logic, circuitry and/or code that may be operable to provide access to a plurality of networks, for example, the cellular network 104a, the public switched telephone network (PSTN) 104b, the IP network 104c and/or the broadband mobile network 104d. The cellular network 104a may comprise 2G and/or 3G networks, for example. The broadband mobile network 104d may comprise 4G networks, for example, WiMax and/or LTE networks. The wired and/or wireless communication backbone 102 and/or the networks 104 may comprise various endpoint and/or user equipment devices. For example, the telephone 124a may be communicatively coupled to the PSTN 104b. In addition, the laptop 124b and/or the application server 124c may be communicatively coupled to the IP network 104c. In this regard, the telephone 124a, laptop 124b and/or application server 124c may be accessible to devices within the hybrid sub-network 118 via the wired and/or wireless communication backbone 102.

In addition, the wired and/or wireless backbone 102 may be communicatively coupled to other sub networks and/or private intranets (not shown) for example. In this manner, the wired and/or wireless communication backbone 102 may enable the UEs 116 to communicate with remote resources such as other user equipment, an application server on the Internet and other network devices that may be communicatively coupled via the networks 104 for example. The wired and/or wireless backbone 102 may be communicatively coupled to the hybrid network controller 110 via the Ethernet, WiMax and/or LTE broadband link 106. Although the Ethernet, WiMax and/or LTE broadband link 106 is shown in FIG. 1, the invention is not so limited. For example, the broadband link 106 may comprise other types of links such as ATM or frame relay for, example.

In operation, the hybrid network controller 110 may manage communication between the UEs 116 and one or more networks 104 within the wired and/or wireless communication backbone 102. The UEs 116 may gain access to the one or more networks 104 via the femtocells 112 and/or the APs 114 and the hybrid network controller 110. In this regard, in instances that a reliable connection may be established between one or more femtocells 112 and a UE 116, data and/or voice may be communicated between the UE 116 and one or more of the networks 104 via the hybrid network controller 110. In instances that a reliable connection may be established between an AP 114 and a UE 116, data may be communicated between the UE 116 and one or more of the networks 104 via the hybrid network controller 110. The hybrid network controller 110 may manage bandwidth and/or QoS on the Ethernet, WiMax and/or LTE broad band link 106 for the femtocells 112 and/or the APs 114. In addition, the hybrid network controller 110 may manage one or more of load balancing between APs 114 and femtocells 112, authentication and/or security management, establishment of calls and/or sessions, call and/or session processing, resource allocation and mobility management based on information exchanged over wired and/or wireless connection 108.

Various parameters may be communicated by the hybrid network controller 110 to the femtocells 112 and/or APs 114 that may comprise a data rate, a modulation scheme, resource allocation, error coding schemes, and transmission power levels for example. In addition, information feedback to the hybrid network controller 110 may comprise a round trip path delay, received signal strength information at the femtocell 112 and/or AP 114, received signal strength information at the UE 116, measured interference at the femtocell 112 and/or AP 114, measured interference at the UE 116, bit error rates at the femtocell 112 and/or AP 114, bit error rates at the UE 116, available bandwidth of the femtocell 112 and/or AP 114 and/or available bandwidth of the UE 116. In addition, timing information and/or location of the UE 116 and/or of one or more of the femtocells 112 and APs 114 may be provided, for example, global navigation satellite system (GNSS) timing and/or location coordinates. Additionally, feedback from a UE 116 may indicate the capabilities of that device to the hybrid network controller 110. Exemplary capabilities which may be communicated may comprise a hardware configuration, a software configuration, maximum transmit power, and battery strength. In this regard, the hybrid network controller 110 may be enabled to manage calls and/or sessions within the hybrid sub-network 118 based on feedback received from the femtocells 112, APs 114 and UEs 116.

Figure 1B:
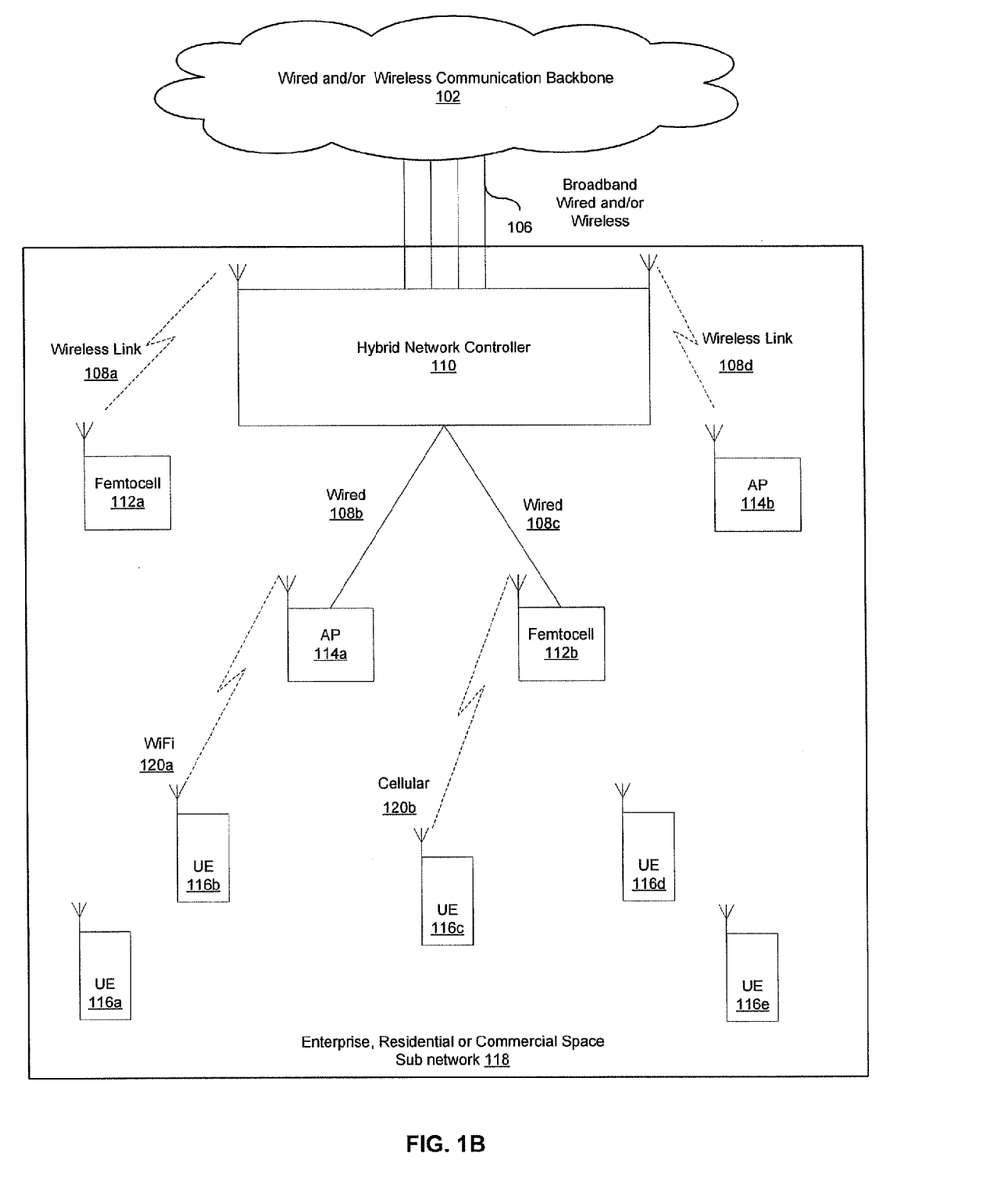
FIG. 1B is a block diagram illustrating an exemplary hybrid network controller enabled to manage a plurality of femtocells and access points, in accordance with an embodiment of the invention.

FIG. 1B is a block diagram illustrating an exemplary hybrid network controller enabled to manage a plurality of femtocells and access points, in accordance with an embodiment of the invention. Referring to FIG. 1B, there is shown the wired and/or wireless communication backbone 102, the Ethernet, WiMax and/or LTE broad band link 106, the wired and/or wireless connections 108, the hybrid network controller 110, the femtocells 112a and 112b, the access points (APs) 114a and 114b, the user equipment (UE) 116a . . . 116e and the hybrid sub-network 118.

The wired and/or wireless communication backbone 102, the Ethernet, WiMax and/or LTE broad band link 106, the wired and/or wireless connection 108, the hybrid network controller 110, the femtocells 112a and 112b, the access points (APs) 114a and 114b, the user equipment (UE) 116a, . . . , 116e and the hybrid sub-network 118 are described with respect to FIG. 1A.

The Ethernet, WiMax and/or LTE broad band link 106 comprises suitable logic circuitry and/or code to carry traffic for the femtocells 112 and the APs 114 to and/or from the wired and/or wireless communication backbone 102. For example, the Ethernet, WiMax and/or LTE broad band link 106 may transport IP packets to one or more of the networks 104 described with respect to FIG. 1A. In addition, the Ethernet, WiMax and/or LTE broad band link 106 may provide access to the Internet and/or one or more private networks. The Ethernet, WiMax and/or LTE broad band link 106 may comprise one or more of optical, wired, and/or wireless links. In various embodiments of the invention, the Ethernet, WiMax and/or LTE broad band link 106 may comprise a WiMax or LTE base station 122. The hybrid network controller 110 may communicate with the networks 104 via the WiMax or LTE base station 122 and the broadband mobile network 104d. In various embodiments of the invention, the Ethernet, WiMax and/or LTE broad band link 106 may comprise a broadband connection such as a digital subscriber line (DSL), Ethernet, passive optical network (PON), a T1/E1 line, a cable television infrastructure, a satellite television infrastructure, and/or a satellite broadband Internet connection.

In operation, the hybrid network controller 110 may be operable to manage communication that is handled by the femtocells 112 and/or the APs 114. For example, the hybrid network controller 110 may manage communication between the UEs 116 and the various femtocells 112 and/or APs 114. In addition, the hybrid network controller 110 may be operable to manage communication of data between the hybrid sub-network 118 and remote endpoints via the wired and/or wireless backbone 102. Accordingly, the hybrid network controller 110 may send and/or receive femtocell 112 and/or AP 114 traffic to and/or from the wired and/or wireless communication backbone 102 via the Ethernet, WiMax and/or LTE broad band link 106. In various embodiments of the invention, the hybrid network controller 110 may be operable to allocate, reallocate, reserve and/or deallocate bandwidth on the Ethernet, WiMax and/or LTE broad band link 106 for the femtocells 112 and/or APs 114. In this regard, the hybrid network controller 110 may determine which femtocell 112 and/or AP 114 may handle a call and/or session with the UE 116. In addition, the hybrid network controller 110 may handle quality of service (QoS) for femtocell 112 and/or AP 114 traffic that is transported by the Ethernet, WiMax and/or LTE broad band link 106.

In various embodiments of the invention, the UEs 116 may communicate with other user equipment and/or application servers via the one or more femtocells 112 and/or APs 114, the hybrid network controller 110, the Ethernet, WiMax and/or LTE broad band link 106, the wired and/or wireless communication backbone 102 and one or more networks 104. For example, a UE 116c may receive a phone call from a remote landline telephone 124a in the PSTN network 104b. In this regard, the hybrid network controller 110 may assign the phone call to the femtocell 112b. The femtocell 112b and the UE 116c may exchange data and/or voice utilizing one or more cellular standards. The femtocell 112b may packetize data received from the UE 116c into one or more IP packets and the IP packets may be further encapsulated, encoded, modulated, or otherwise processed. The IP packets may then be routed via the wired and/or wireless connections 108c to the hybrid network controller 110. The hybrid network controller 110 may analyze bandwidth and/or QoS levels for traffic to and/or from the wired and/or wireless communication backbone 102 and may manage routing of packets from various femtocells 112 and/or APs 114. The hybrid network controller 110 may route the IP packets received from the femtocell 112b via the Ethernet, WiMax and/or LTE broad band link 106 to the PSTN 104b or other network.

In another exemplary embodiment of the invention, the UE 116b may be operable to initiate a connection with the application server 124c on the Internet to download and/or upload multimedia data or may initiate a voice over IP connection with a remote laptop 124b via the wired and/or wireless communication backbone 102. The hybrid network controller 110 may determine that the AP 114a may handle the connection for the UE 116b via the WiFi connection 120a. The UE 116b and AP 114a may exchange data utilizing one or more 802.11 standards. The AP 114a may send or receive the data to and/or from the hybrid network controller 110 via the wired and/or wireless connections 108. The hybrid network controller 110 may route the data via the Ethernet, WiMax and/or LTE broad band link 106 to the appropriate destination in the wired and/or wireless communication backbone 102. In various embodiments of the invention, the hybrid network controller 110 may be operable to route data between one or more of the UEs 116 within the hybrid sub-network 118 via the wired and/or wireless connections 108, the femtocells 112 and the APs 114.

Figure 1C:
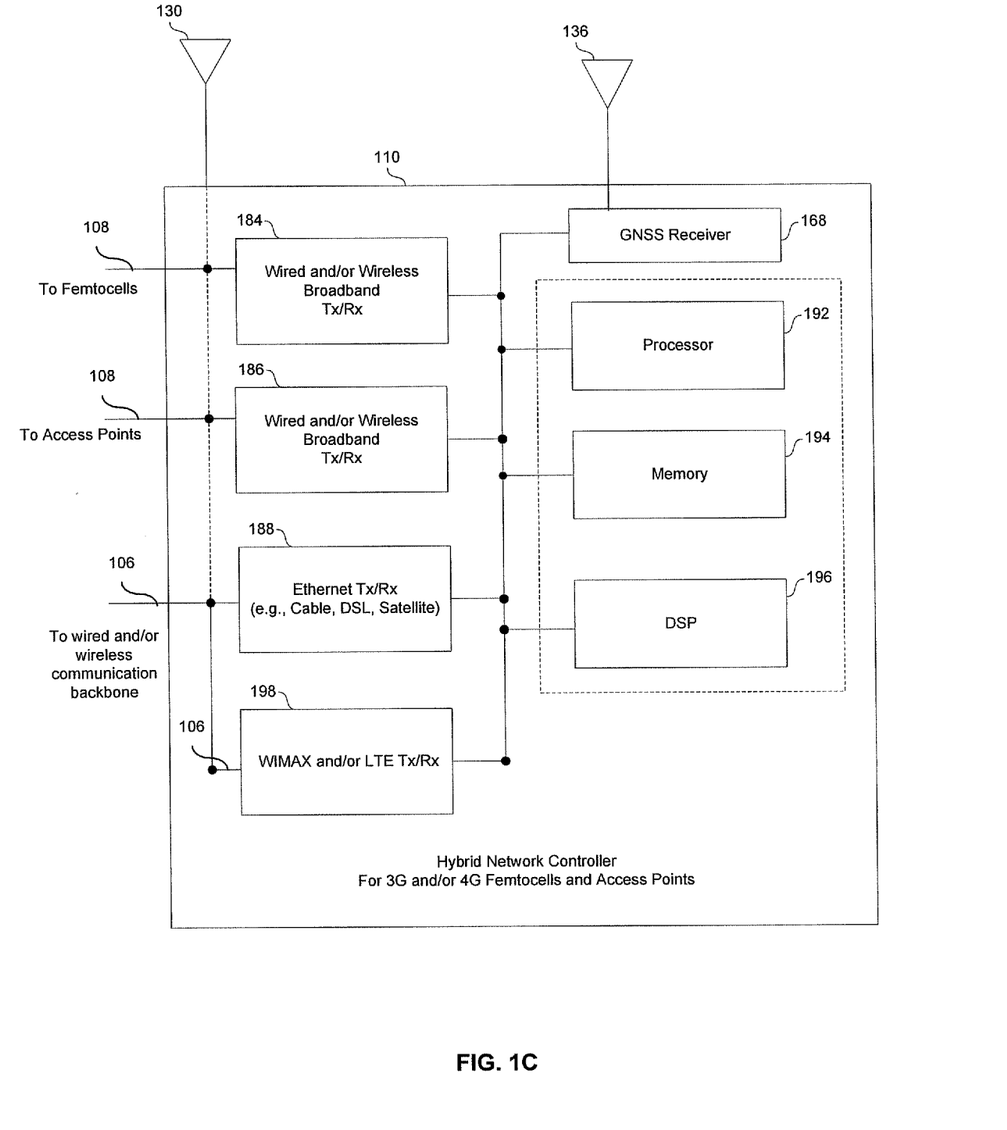
FIG. 1C is a block diagram of an exemplary hybrid network controller, in accordance with an embodiment of the invention.

FIG. 1C is a block diagram of an exemplary hybrid network controller, in accordance with an embodiment of the invention. Referring to FIG. 1C, there is shown, the hybrid network controller 110 that may comprise a wired and/or wireless broadband Tx/Rx 184, a wired and/or wireless broadband Tx/Rx 186, an Ethernet Tx/Rx 188, a WiMax and/or LTE Tx/Rx 198, a GNSS receiver 168, a GNSS antenna 136, a processor 192, a memory 194 and a DSP 196.

The Ethernet Tx/Rx 188 may comprise suitable logic, circuitry, and/or code that may be operable to transmit and/or receive data to and/or from the wired and/or wireless communication backbone via the Ethernet, WiMax and/or LTE broad band link 106. The Ethernet Tx/Rx 188 may be operable to perform exemplary operations or functions comprising amplification, down-conversion, filtering, demodulation, and analog to digital conversion of received signals. The Ethernet Tx/Rx 188 may be operable to perform exemplary operations or functions comprising amplification, up-conversion, filtering, modulation, and digital to analog conversion of transmitted signals. In various exemplary embodiments of the invention, the Ethernet Tx/Rx 188 may transmit and/or receive data over the Ethernet, WiMax and/or LTE broad band link 106 which may comprise, for example, a T1/E1 line, PON, DSL, cable television infrastructure, satellite broadband internet connection and/or satellite television infrastructure for example.

The WiMax and/or LTE Tx/Rx 198 may comprise suitable logic, circuitry, and/or code that may be operable to transmit and/or receive data via the antenna 130 to and/or from a WiMax and/or LTE base station and/or the broadband mobile network 104*d* in the wired and/or wireless communication backbone 102. In this regard, the WiMax and/or LTE base station may be utilized for the Ethernet, WiMax and/or LTE broad band link 106. The WiMax and/or LTE Tx/Rx 198 may be operable to perform amplification, down-conversion, filtering, demodulation, and analog to digital conversion of received signals. The WiMax and/or LTE Tx/Rx 198 may be operable to perform exemplary operations or functions comprising amplification, up-conversion, filtering, modulation, and digital to analog conversion of transmitted signals.

The wired and/or wireless broadband Tx/Rx 184 and 186 may comprise suitable logic, circuitry, and/or code that may be operable to transmit and/or receive data in adherence to one or more broadband communication standards to the femtocells 112 and/or APs 114 via the wired and/or wireless connections 108. For example, the hybrid network controller 110 may communicate with the femtocells 112 and/or APs 114 via an Ethernet cable and/or via a WLAN interface and the antenna 130 for example. The broadband Tx/Rx 184 and/or 186 may be operable to perform amplification, down-conversion, filtering, demodulation, and analog to digital conversion of received signals. In addition, the broadband Tx/Rx 184 and/or 186 may be operable to perform amplification, up-conversion, filtering, modulation, and digital to analog conversion of transmitted signals.

The antenna 130 may be suitable for transmitting and/or receiving signals to and/or from the wired and/or wireless communication backbone 102 and/or to and/or from the femtocells 112 and/or APs 114. Although a single antenna 130 is illustrated, the invention is not so limited. In this regard, the Tx/Rx 184, Tx/Rx 186, Tx/Rx 188 and/or Tx/Rx 198 may utilize a common antenna for transmission and reception, may utilize different antennas for transmission and reception, and/or may utilize a plurality of antennas for transmission and/or reception.

Figure 1D:
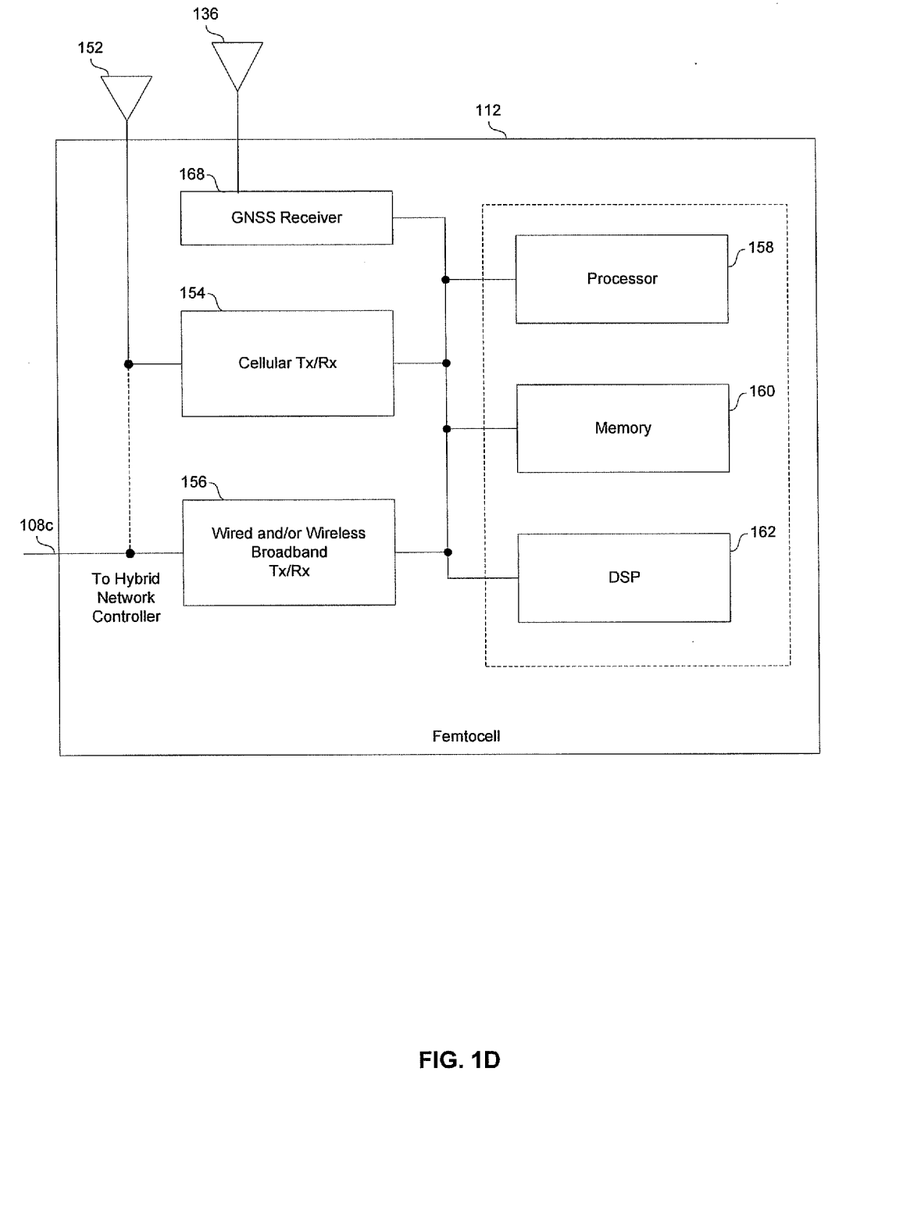
FIG. 1D is a block diagram of an exemplary femtocell, in accordance with an embodiment of the invention.

The GNSS receiver 168 and GNSS antenna 136 may be similar and/or the same as the GNSS receive 168 and GNSS antenna 136 described with respect to FIG. 1D.

The processor 192 may comprise suitable logic, circuitry, and/or code that may enable processing data and/or controlling operations of the hybrid network controller 110. In this regard, the processor 192 may be enabled to provide control signals to the various other blocks within the hybrid network controller 110. The processor 192 may also control data transfers between various portions of the hybrid network controller 110. Additionally, the processor 192 may enable execution of applications programs and/or code. In various exemplary embodiments of the invention, the applications, programs, and/or code may enable, for example, parsing, transcoding, or otherwise processing data. In various embodiments of the invention, the applications, programs, and/or code may enable, for example, configuring and/or controlling operation of the wired and/or wireless broadband Tx/Rx 184 and/or 186, the Ethernet Tx/Rx 188, the WiMax and/or LTE Tx/Rx 198, the GNSS receiver 168, the DSP 196, and/or the memory 194. For example, transmission power levels may be configured and/or transmission times may be scheduled. In various embodiments of the invention, the processor 192 may manage communication of data and/or QoS for data communicated via the Ethernet, WiMax and/or LTE broad band link 106 by the Ethernet Tx/Rx 188 and/or the WiMax and/or LTE Tx/Rx 198. In various embodiments of the invention, the processor 192 may send control information to the femtocells 112, the APs 114 and/or the UEs 116. In this regard, the processor 192 may be enabled to control communication between the femtocells 112 the APs 114 and the UEs 116. For example, the processor 192 may determine and communicate control parameters such as power level, modulation schemes, error coding schemes, and/or data rates.

The memory 194 may comprise suitable logic, circuitry, and/or code that may enable storage or programming of information that includes, for example, parameters and/or code that may effectuate the operation of the hybrid network controller 110. Parameters may comprise configuration data and the code may comprise operational code such as software and/or firmware, but the information need not be limited in this regard. Moreover, the parameters may include adaptive filter and/or block coefficients. Additionally, the memory 194 may buffer or otherwise store received data and/or data to be transmitted. In various embodiments of the invention, the memory 192 may comprise QoS and/or control parameters for traffic managed by the hybrid network controller 110. In addition, one or more look-up tables which may be utilized for determining which of the UEs 116 within a coverage area of the femtocells 112 and/or the APs 114 may be stored in the memory 194.

The DSP 196 may comprise suitable logic, circuitry, interfaces and/or code that may be operable to perform computationally intensive processing of data. In various embodiments of the invention, the DSP 196 and/or the processor 192 may be operable to handle exemplary operations comprising encoding, decoding, modulating, demodulating, encryption, decryption, scrambling, descrambling, and/or otherwise processing of data. For example, in instances when the hybrid network controller 110 may communicate with a femtocell, the DSP 196, processor 192 and/or memory 124 may perform physical layer functions such as encoding and/or decoding, as well as OSI layer two and/or layer three functionality. Alternatively, the hybrid network controller 110 may communicate with an access point based on IP protocol. In various embodiments of the invention, the DSP 196 may be enabled to adjust a modulation scheme, error coding scheme, and/or data rates of transmitted signals.

In operation, the hybrid network controller 110 may allocate bandwidth on the Ethernet, WiMax and/or LTE broad band link 106 for the femtocells 112 and/or APs 114. In this regard, the hybrid network controller 110 may determine which femtocell 112 and/or AP 114 may handle a call and/or session with the UEs 116. In addition, the hybrid network controller 110 may handle quality of service (QoS) for femtocell 112 and/or AP 114 traffic that is transported to the wired and/or wireless communication backbone 102 via the Ethernet, WiMax and/or LTE broad band link 106. In various embodiments of the invention, the hybrid network controller 110 may communicate control information to the femtocells 112 and/or APs 114 and receive measurements and/or status from them. For example, the femtocells 112 and/or APs 114 may communicate received signal strengths, RF interference and/or bandwidth availability that may be utilized to determine new operating parameters and/or how to assign new calls and/or communication sessions. In this regard, the hybrid network controller 110 may manage communication between femtocells 112 and/or APs 114 and the various UEs 116.

One or more of the processor 192, the memory 194 and the DSP 196 within the hybrid network controller 110 may be operable to implement a femto stack that supports communication with the femtocells 112 and other femtocell communication functions. The hybrid network controller 110 may control one or more of load balancing between APs 114 and femtocells 112, traffic management, authentication and/or security management, call and/or session setup, call and/or session processing, resource allocation and mobility management for the femtocells 112 and/or APs 114. For example, the hybrid network controller 110 may manage the Femtocells 112 and/or APs 114 within the hybrid sub-network 118 and may limit access to and/or handoffs between various networks and/or network entities.

FIG. 1D is a block diagram of an exemplary femtocell, in accordance with an embodiment of the invention. Referring to FIG. 1D, there is shown a femtocell 112 comprising an antenna 152, a cellular transmitter and/or receiver (Tx/Rx) 154, a wired and/or a wireless broadband transmitter and/or receiver (Tx/Rx) 156, a processor 158, a memory 160, a digital signal processor (DSP) 162, a global navigation satellite system (GNSS) receiver 168 and a GNSS antenna 136. The femtocell 112 may be similar to or the same as the femtocells 112 described with respect to FIG. 1A and/or FIG. 1B.

The GNSS receiver 168 and GNSS antenna 136 comprise suitable logic, circuitry and/or code to receive signals from one or more GNSS satellites, for example, GPS satellites. The received signals may comprise timing, ephemeris, long term orbit information, and/or almanac information that enable the GNSS receiver 168 to determine its location and/or time.

The antenna 152 may be suitable for transmitting and/or receiving cellular signals and/or broadband signals. Although a single antenna is illustrated, the invention is not so limited. In this regard, the cellular Tx/Rx 154 and/or wired and/or wireless broadband Tx/Rx 156 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform exemplary operations and/or functions comprising amplification, up-conversion, filtering, modulation, and/or digital to analog conversion of transmitted cellular signals. The cellular Tx/Rx 154 may be operable to support communication over a plurality of communication channels utilizing time division multiple access (TDMA), code division multiple access (CDMA) and/or orthogonal frequency division multiplexing (OFDM) for example. In addition, exemplary cellular standards supported by the femtocells 112 may be specified in the International Mobile Telecommunications-2000 (IMT-2000) standard and/or developed by the $3^{rd}$ generation partnership project (3GPP), the $3^{rd}$ generation partnership project 2 (3GPP2) and/or fourth generation specifications. In various embodiments of the invention, the cellular Tx/Rx 154 may be enabled to measure received signal strength and may adjust a power level and/or a modulation scheme or level of transmitted signals.

The wired and/or wireless broadband Tx/Rx 156 may comprise suitable logic, circuitry, and/or code that may be operable to transmit voice and/or data in adherence to one or more broadband standards to the hybrid network controller 110 for one or more UEs 116. The broadband Tx/Rx 156 may be operable to perform exemplary functions or operations comprising amplification, down-conversion, filtering, demodulation, and/or analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data to the hybrid network controller 110 over the wired connection 108*a* and/or over the wireless connection 108*c* via the antenna 152.

The processor 158 may comprise suitable logic, circuitry, and/or code that may enable processing data and/or controlling operations of the femtocell 112. In this regard, the processor 158 may be enabled to provide control signals to the various other blocks within the femtocell, for example the DSP 162, memory 160 and/or Tx/Rx 154. The processor 158 may also control data transfers between various portions of the femtocell 112. Additionally, the processor 158 may enable execution of applications programs and/or code. In various embodiments of the invention, the applications, programs, and/or code may enable, for example, parsing, transcoding, and/or otherwise processing data. In various embodiments of the invention, the applications, programs, and/or code may enable, for example, configuring or controlling operation of the cellular transmitter and/or receiver 154, the broadband transmitter and/or receiver 156, the DSP 162, and/or the memory 160. In various embodiments of the invention, the processor 158 may receive control information from the hybrid network controller 110. In this regard, the processor 158 may be enabled to provide one or more signals to the cellular Tx/Rx 154, the memory 160, and/or the DSP 162 to control communication between the femtocell 112 and the UE 116. In addition, the processor 158 may control exemplary parameters comprising power level, modulation scheme, error coding scheme, and/or data rates of transmitted cellular signals.

The memory 160 may comprise suitable logic, circuitry, and/or code that may enable storage or programming of information that includes parameters and/or code that may effectuate the operation of the femtocell 112. A portion of the programming information and/or parameters may be received from the hybrid network controller 110. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In various embodiments of the invention, the memory 160 may comprise one or more look-up tables which may be utilized for determining cellular devices that may be within a coverage area of the femtocell 112.

The DSP 162 may comprise suitable logic, circuitry, and/or code operable to perform computationally intensive processing of data. In various exemplary embodiments of the invention, the DSP 162 may operable to encode, decode, modulate, demodulate, encrypt, decrypt, scramble, descramble, and/or otherwise process data. For example, in instances when the femtocell 112 may communicate with a femtocell, the DSP 162, the processor 158 and/or the memory 160 may perform physical layer functions such as encoding and/or decoding, as well as OSI layer two and/or layer three functionality. Alternatively, the femtocell 112 may communicate with an access point based on IP protocol. In various embodiments of the invention, the DSP 162 may be enabled to adjust a modulation scheme, error coding scheme, and/or data rates of transmitted cellular signals data.

In operation, the femtocell 112 may handle communication between one or more UEs 116 and a remote communication device, for example, the telephone 124a, the laptop 124b and/or the application server 124c. In this regard, one or more of the processor 158, the memory 160 and the DSP 162 may be operable to implement a femtocell stack that supports communication with the femtocells 112 and/or other femtocell communication functions. The broadband Tx/Rx 156 may receive communication management messages from the hybrid network controller 110. The processor 158 may utilize the received management messages to configure the cellular Tx/Rx 154 and/or the DSP 162 with control parameters for a communication channel to the UEs 116. Control parameters may comprise transmission power levels, error coding scheme for transmitted cellular signals, data rates for transmitted cellular signals, and modulation scheme for transmitted signals. Additionally, management messages from the hybrid network controller 110 may be communicated to the UEs 116 via the cellular Tx/Rx 154.

The cellular Tx/Rx 154 may determine characteristics such as interference levels and signal strength of desired signals received via a cellular communication channel. Similarly, the DSP 162 and/or the processor 156 may be operable to determine bit error rates of data received via a cellular communication channel and available bandwidth of the channel. The measurements may be communicated to the hybrid network controller 110 by the Broadband Tx/Rx 156 via the wired connection 108a and/or the wireless connection 108c. Additionally, the femtocell 112 may receive feedback from a UE 116 on the other end of a cellular communication channel and the received feedback information may be communicated to the hybrid network controller 110 by the broadband Tx/Rx 156.

Figure 1E:
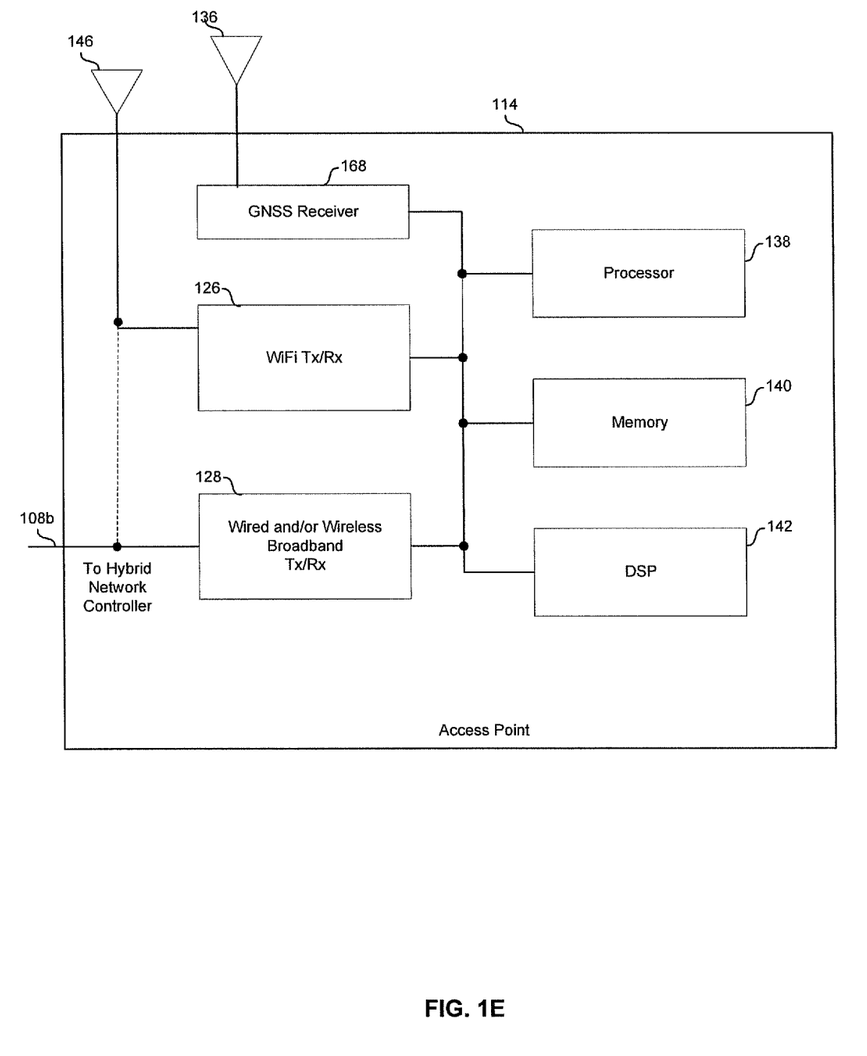
FIG. 1E is a block diagram of an exemplary access point, in accordance with an embodiment of the invention.

FIG. 1E is a block diagram of an exemplary access point, in accordance with an embodiment of the invention. Referring to FIG. 1E, there is shown an AP 114 comprising an antenna 146, a WiFi transmitter and/or receiver (Tx/Rx) 126, a wired and/or a wireless broadband transmitter and/or receiver (Tx/Rx) 128, a processor 138, a memory 140, a digital signal processor (DSP) 142, a global navigation satellite system (GNSS) receiver 168 and a GNSS antenna 136. The AP 114 may be similar to or the same as the APs 114 described with respect to FIG. 1A and/or FIG. 1B.

The GNSS receiver 168 and GNSS antenna 136 may be similar and/or the same as the GNSS receive 168 and GNSS antenna 136 described with respect to FIG. 1D.

The antenna 152 may be suitable for transmitting and/or receiving signals to and/or from the UEs 116 and/or to and/or from the hybrid network controller 110. Although a single antenna is illustrated, the invention is not so limited. In this regard, the WiFi Tx/Rx 126 and/or wired and/or wireless broadband Tx/Rx 128 may utilize a common antenna for transmission and reception, may utilize different antennas for transmission and reception, and/or may utilize a plurality of antennas for transmission and/or reception.

The WiFi Tx/Rx 126 may be similar to the wired and/or wireless broadband Tx/Rx 184 and/or 186 and/or the WiMax and/or LTE Tx/Rx 198. In this regard, the WiFi Tx/Rx 126 may be operable to perform the functions described with respect to the Tx/Rx 184 and/or 186. Moreover, the WiFi Tx/Rx 126 may comprise suitable logic circuitry and/or code that may be operable to transmit and/or receive data to the UEs 116 utilizing 802.11 standards. In various embodiments of the invention, an AP 114 may utilize the same Tx/Rx 126 for communicating with UEs 116 and with the hybrid network controller 110.

The wired and/or wireless broadband Tx/Rx 128 may comprise suitable logic, circuitry, and/or code that may be operable to transmit data in adherence to one or more broadband standards to the hybrid network controller 110 for one or more UEs 116. In this regard, the wired and/or wireless broadband Tx/Rx 128 may communicate data to and/or from a plurality of UEs 116 to and/or from the hybrid network controller 110. The wired and/or wireless broadband Tx/Rx 128 may be operable to perform amplification, down-conversion, filtering, demodulation, and analog to digital conversion of received signals. The wired and/or wireless broadband Tx/Rx 128 may be operable to perform exemplary functions and/or operations amplification, up-conversion, filtering, modulation, and digital to analog conversion of transmitted signals. In various exemplary embodiments of the invention, the wired and/or wireless broadband Tx/Rx 128 may transmit and/or receive data over the wired connection 108b and/or over the wireless connection 108d via the antenna 152. In various embodiments of the invention, an AP 114 may utilize the same Tx/Rx 128 for communicating with the UEs 116 and with the hybrid network controller 110.

The processor 138 may comprise suitable logic, circuitry, and/or code that may enable processing data and/or controlling operations of the AP 114. In this regard, the processor 138 may be enabled to provide control signals to the various other blocks comprising the AP 114. The processor 138 may also control data transfers between various portions of the AP 114. Additionally, the processor 138 may enable execution of applications programs and/or code. In various embodiments of the invention, the applications, programs, and/or code may enable, for example, parsing, transcoding, or otherwise processing data. The applications, programs, and/or code may enable, for example, configuring or controlling operation of the WiFi Tx/Rx 126, the broadband Tx/Rx 128, the DSP 142, and/or the memory 140. The processor 168 may receive control information from the hybrid network controller 110. In this regard, the processor 168 may be enabled to provide one or more signals to the WiFi Tx/Rx 126, the wired and/or wireless broadband Tx/Rx 128, the memory 140, and/or the DSP 142 to control communication between the AP 114 and the UEs 116. In addition, the processor 138 may control parameters such as power level, modulation scheme, error coding scheme, and/or data rates of transmitted WiFi signals The memory 140 may comprise suitable logic, circuitry, and/or code that may enable storage or programming of information that includes parameters and/or code that may effectuate the operation of the AP 114. A portion of the programming information and/or parameters may be received from the hybrid network controller 110. Parameters may comprise configuration data and the code may comprise operational code such as software and/or firmware, but the information need not be limited in this regard. Moreover, the parameters may include adaptive filter and/or block coefficients. Additionally, the memory 140 may buffer or otherwise store received data and/or data to be transmitted. In various embodiments of the invention, the memory 140 may comprise one or more look-up tables which may be utilized for determining WiFi access within a coverage area of the AP 114.

The DSP 142 may comprise suitable logic, circuitry, and/or code operable to perform computationally intensive processing of data. In various embodiments of the invention, the DSP 142 may encode, decode, modulate, demodulate, encrypt, decrypt, scramble, descramble, and/or otherwise process data. The DSP 142 may be enabled to adjust a modulation scheme, error coding scheme, and/or data rates of transmitted WiFi signal data.

In operation, the AP 114 may handle communication between one or more UEs 116 and a remote communication device, for example, the telephone 124a, the laptop 124c and/or the application server 124c. In this regard, the broadband Tx/Rx 128 may receive network management messages from the hybrid network controller 110. The processor 138 may utilize the received management messages to configure the WiFi Tx/Rx 126 and/or the DSP 142 to control parameters of the WiFi communication channel 120a to the UEs 116 such as transmission power levels, error coding scheme for transmitted cellular signals, data rates for transmitted cellular signals, and modulation scheme for transmitted signals. Additionally, management messages from the hybrid network controller 110 may be communicated to the UEs 116 via the WiFi Tx/Rx 126.

The WiFi Tx/Rx 126 may determine characteristics such as interference levels and signal strength of desired signals received via a WiFi communication channel. Similarly, the DSP 142 and/or the processor 138 may determine bit error rates of data received via a WiFi communication channel and available bandwidth of the channel. The measurements may be communicated to the hybrid network controller 110 by the Broadband Tx/Rx 128 via the wired connection 108b and/or the wireless connection 108d. Additionally, the AP 114 may receive feedback from a UE 116 via the WiFi link 120a that may also be communicated to the hybrid network controller 110 by the wired and/or wireless broadband Tx/Rx 128.

Figure 1F:
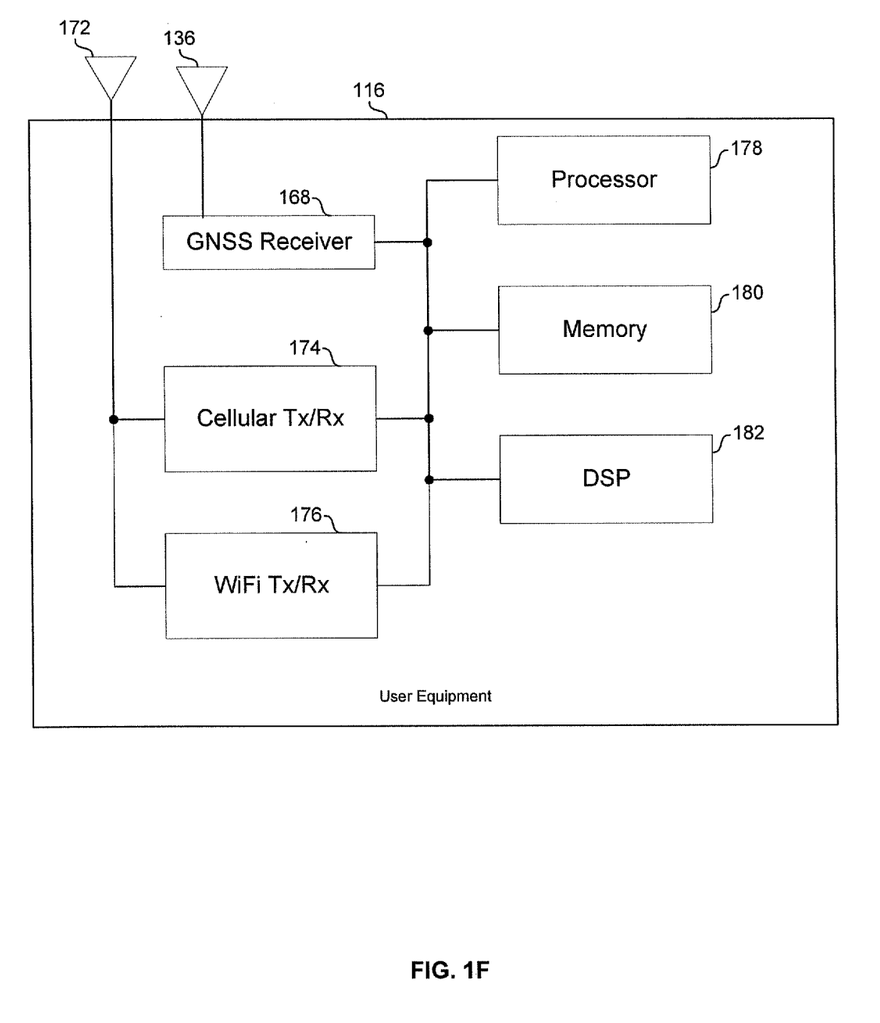
FIG. 1F is a block diagram of exemplary user equipment, in accordance with an embodiment of the invention.

FIG. 1F is a block diagram of exemplary user equipment, in accordance with an embodiment of the invention. The UEs 116 may comprise a cellular Tx/Rx 174, a WiFi Tx/Rx 176, an antenna 172, a global navigation satellite system (GNSS) receiver 168, a GNSS antenna 136, a processor 178, a memory 180, and a DSP 182. The UEs 116 may be similar or the same as one or more of the UEs 116a, . . . , 116g described with respect to FIG. 1A and/or 1B. The GNSS receiver 168 and GNSS antenna 136 may be similar or the same as the GNSS receiver 168 and GNSS antenna 136 described with respect to FIG. 1C.

The global navigation satellite system (GNSS) receiver 168 and the GNSS antenna 136 are described with respect to FIG. 1D.

The antenna 152 may be suitable for transmitting and/or receiving cellular signals and/or broadband signals. Although a single antenna is illustrated, the invention is not so limited. In this regard, the cellular Tx/Rx 154 and/or wired and/or wireless broadband Tx/Rx 156 may utilize a common antenna for transmission and reception, may utilize different antennas for transmission and reception, and/or may utilize a plurality of antennas for transmission and/or reception.

The cellular Tx/Rx 174 may be similar to or the same as the cellular Tx/Rx 154 described with respect to FIG. 1D. The cellular Tx/Rx 174 may enable communication between a UE 116 and one or more femtocells 112. In various embodiments of the invention, the cellular Tx/Rx 174 may comprise a rake receiver that may combine signals received from a plurality of femtocells. In this regard, the rake receiver may combine signals that are received within a specified delay spread from one or more femtocells. In other embodiments of the invention, synchronized signal transmissions from a plurality of femtocells that are received by the cellular Tx/Rx 174 via the cellular antenna 172, may constructively combine such that a more robust signal is received. In this regard, the plurality of femtocells may be enabled to lower their transmission power levels. Although the FIG. 1F comprises two Tx/Rx units for cellular and WiFi, the UEs 116 are not limited in this regard. For example, the UEs 116 may be a multi-mode device that may comprise a plurality of Tx/Rx units and may be operable to communicate based on a plurality of wireless voice and/or data communication standards, for example, 3GPP, 3GPP2, LTE, WiMax, 802.11, Bluetooth and Zigbee.

The WiFi Tx/Rx 176 may be similar and/or the same as the WiFi Tx/Rx described with respect to FIG. 1E. The WiFi Tx/Rx 176 may enable communication between a UE 116 and one or more APs 114.

The processor 178 may comprise suitable logic, circuitry, and/or code that may enable processing data and/or controlling operations of the UEs 116. In this regard, the processor 178 may be enabled to provide control signals to the various other blocks within the UE 116. The processor 178 may also control data transfers between various portions of the UE. Additionally, the processor 178 may enable execution of applications programs and/or code. In various embodiments of the invention, the applications, programs, and/or code may enable processing data. The applications, programs, and/or code may enable, for example, configuring or controlling operation of the cellular Rx/Rx 174, the GNSS receiver 168, the WiFi TxRx 176, the DSP 182, and/or the memory 180. The processor 178 may receive control information from the hybrid network controller 110. In this regard, the processor 178 may be enabled to provide one or more signals to the cellular Tx/Rx 174, the WiFi Tx/Rx 176, the memory 180, and/or the DSP 182 to control communication between the UEs 116 and the femtocell 112 or the AP 114. In addition, the processor 178 may control parameters such as power level, modulation scheme, error coding scheme, and/or data rates of transmitted cellular and/or WiFi signals.

The memory 180 may comprise suitable logic, circuitry, and/or code that may enable storage or programming of information that includes parameters and/or code that may effectuate the operation of the UE 116. A portion of the programming information and/or parameters may be received from the hybrid network controller 110. Parameters may comprise configuration data and the code may comprise operational code such as software and/or firmware, but the information need not be limited in this regard. Moreover, the parameters may include adaptive filter and/or block coefficients. Additionally, the memory 180 may buffer or otherwise store received data and/or data to be transmitted. In various embodiments of the invention, the memory 180 may comprise one or more look-up tables which may be utilized to determine which Femtocells and/or APs are within range of the UEs 116.

The DSP 182 may comprise suitable logic, circuitry, and/or code operable to perform computationally intensive processing of data. The DSP 182 may be operable to encode, decode, modulate, demodulate, encrypt, decrypt, scramble, descramble, and/or otherwise process data. In various embodiments of the invention, the DSP 182 may be enabled to adjust a modulation scheme, error coding scheme, and/or data rates of transmitted cellular and/or WiFi signal data.

In operation, the UEs 116 may communicate with remote communication devices, for example, the telephone 124a, the laptop 124b and/or the application server 124c via one or more of femtocells 112 and APs 114 that are controlled by the hybrid network controller 110. The hybrid network controller may provide control information to UEs 116 via one or more femtocells 112 and APs 114 for example. In addition, the hybrid network controller 110 may assign a particular femtocell 112 and/or AP 114 to handle a call and/or session of the UEs 116. The hybrid network controller 110 may handle QoS for data and/or voice traffic of a UE 116 call and/or session.

In an exemplary embodiment of the invention, control messages from the hybrid network controller 110 may be received by the UEs 116 via the cellular Tx/Rx 174 and/or the WiFi Tx/Rx 176. The processor 178 may utilize the received control information to configure the UEs 116 and/or to manage call and/or session set up and/or call and/or session processing. In addition, the hybrid network controller 110 may manage transmission power levels, error coding scheme, data rates, and modulation scheme for signals transmitted from the UEs 116.

Furthermore, The UEs 116 may communicate various operational status to the hybrid network controller 110. For example, the cellular Tx/Rx 174 and/or the WiFi Tx/Rx 176 may determine characteristics such as interference levels and signal strength of desired signals received via a cellular and/or WiFi communication channel. Similarly, the DSP 182 and/or the processor 156 may determine bit error rates of received data and available bandwidth of the cellular and/or WiFi channel. Information stored in the memory 160 and/or measurements taken by the Tx/Rx 174, Tx/Rx 176 and/or DSP 182 may be communicated to the hybrid network controller 110 via the Femtocell 112 and/or the AP 114.

In various embodiments of the invention, the UEs 116 may be a multimode wireless device and may comprise a plurality of diverse wireless transmitters and/or receivers (Tx/Rx). In this regard, the UEs 116 may be operable to receive signals from one or more femtocells or APs that may utilize different wireless standards. The UEs 116 may be operable to select portions of information and/or combine information from the plurality of received signals based on the quality of received information and/or the quality of the received signals.

Figure 2:
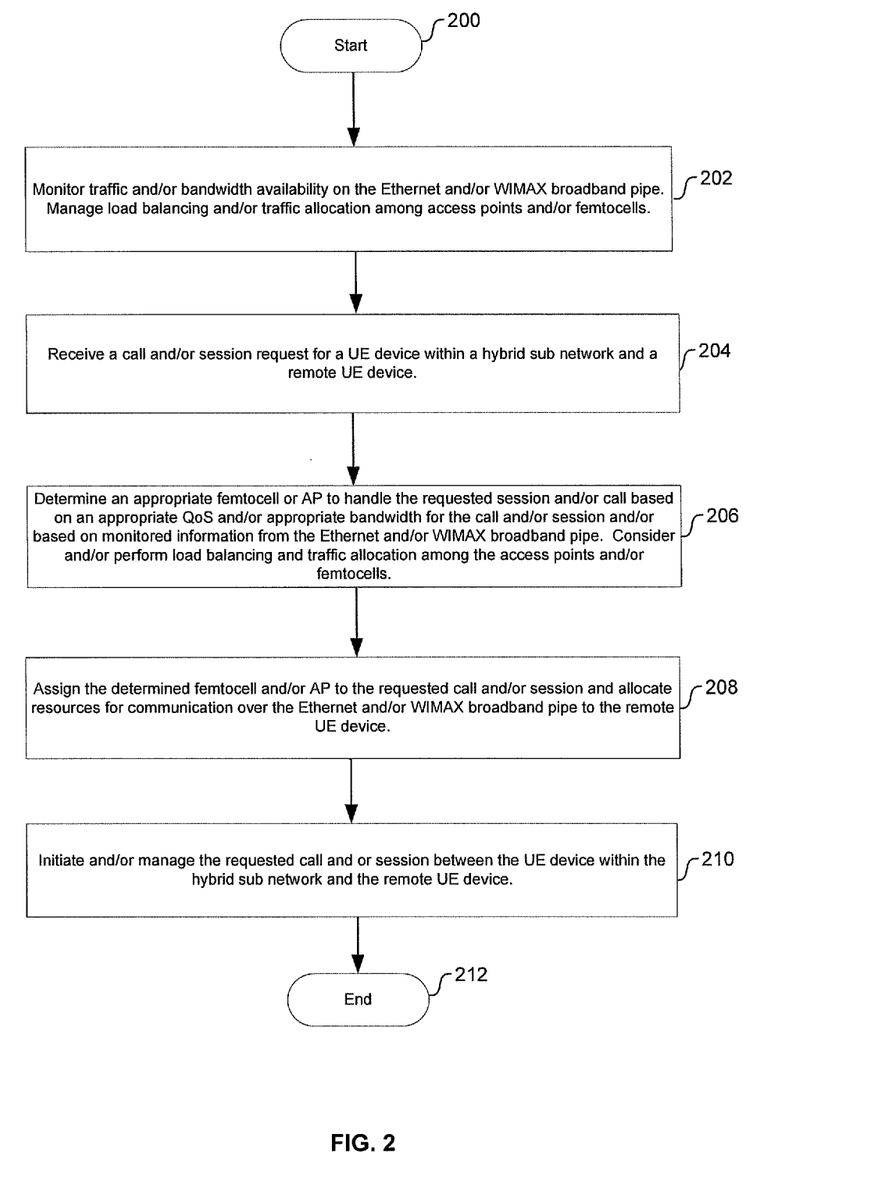
FIG. 2 illustrates exemplary steps for managing communication for a hybrid sub network comprising femtocells and/or access points by a hybrid network controller, in accordance with an embodiment of the invention.

FIG. 2 illustrates exemplary steps for managing communication for a hybrid sub-network comprising femtocells and/or access points by a hybrid network controller, in accordance with an embodiment of the invention. Referring to FIG. 2, the exemplary steps may begin with start step 200. In step 202, the hybrid network controller 110 may monitor traffic and/or bandwidth availability on the Ethernet, WiMax and/or LTE broad band link 106. In addition, the hybrid network controller 110 may manage load balancing and/or traffic allocation among access points 114 and/or femtocells 112. In step 204, the hybrid network controller 110 may receive a request for a call and/or session for a UE 116 device within a hybrid sub-network 118 and a remote UE device in the wired and/or wireless communication backbone 102. For example, the remote UE may be a cellular phone served by the cellular network 104 104a. In step 206, the hybrid network controller 110 may determine which femtocell or AP within the hybrid sub-network 118 may be appropriate for handling the requested session and/or call. The hybrid network controller 110 may base the determination on an appropriate QoS for the session and/or call and/or an appropriate bandwidth for the session and/or call. For example, voice may require a particular QoS or a user may request delivery of content having a particular QoS. In addition, the determination may be based on information from monitoring traffic and/or bandwidth availability on the Ethernet, WiMax and/or LTE broad band link 106. The hybrid network controller 110 may consider and/or perform load balancing and traffic allocation among the access points 114 and/or femtocells 112. In step 208, the hybrid network controller 110 may assign the determined femtocell 112 and/or AP 114 to the requested call and/or session and may allocate resources for communication of data for the call and/or session over the Ethernet, WiMax and/or LTE broad band link 106 to the remote UE device. In step 210, the hybrid network controller 110 may Initiate and/or manage the requested call and or session between the UE device 116 within the hybrid sub-network 118 and the remote UE device. The exemplary steps may end with step 212.

In various embodiments of the invention, a communication system may comprise a hybrid network controller 110, one or more femtocells 112, one or more access points 114 and one or more endpoint devices 116. The access points 114 may comprise, for example, WLAN, WiMax and/or LTE access points. The hybrid network controller 110 may be communicatively coupled with the one or more femtocells 112 and/or the one or more access points 114. In addition, the hybrid network controller 110 may control communication of information between two or more of the femtocells 112, the access points 114 and the endpoint devices 116. In this regard, the hybrid network controller 110 may communicate control information to the one or more endpoint devices 116, the one or more femtocells 112, the one or more access points 114 to enable the communication of information. For example, the hybrid network controller 110 may enable a specified femtocell 112 and/or a specified access point 114 for communication of the information based on the communicated control information. Furthermore, the hybrid network controller 110 may manage the one or more femtocells 112 and/or the one or more access points 114. More specifically, the hybrid network controller 110 may manage the communication of information via one or more of the femtocells 112, and/or one or more of the access points 114.

In various embodiments of the invention, the hybrid network controller 110 may handle network traffic associated with the communication of the information between two or more of the endpoint devices 110, the femtocells 112 and/or the access points 114. Moreover, the hybrid network controller 110 may control one or more wired and/or wireless interfaces, for example, the cellular Tx/Rx 154, the WiFi Tx/Rx 126 and/or the wire and/or wireless broadband Tx/Rx 128, for handling of the network traffic. Quality of service and/or bandwidth allocation may be managed by the hybrid network controller 110. In addition, resources utilized by the endpoint devices 116, the femtocells 112, access points 114 for communication of the information may be allocated and/or de-allocated by the hybrid network controller 110.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a hybrid network controller for femtocells and access points.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication using a hybrid network controller, comprising:
   receiving a communication request for an endpoint device at the hybrid network controller, the hybrid network controller being communicatively coupled to a femtocell and a non-femtocell access point;
   determining, by the hybrid network controller, an access device to handle the communication request based on a requirement of the communication request, wherein determining the access device comprises choosing one of the femtocell and the non-femtocell access point;
   assigning the determined access device the communication request; and
   controlling communication of information between the endpoint device and the determined access device.

2. The method according to claim 1, further comprising communicating control information from the hybrid network controller to the endpoint device using the determined access device to enable the communication of the information.

3. The method according to claim 2, further comprising enabling the determined access device for the communication of the information based on the communicated control information.

4. The method according to claim 1, further comprising managing, by the hybrid network controller, the femtocell and the non-femtocell access point.

5. The method according to claim 1, further comprising managing, by the hybrid network controller, the communication of the information via the determined access device.

6. The method according to claim 1, further comprising handling, by the hybrid network controller, network traffic associated with the communication of the information between the endpoint device and the determined access device.

7. The method according to claim 6, further comprising controlling, by the hybrid network controller, an interface for the handling of the network traffic, wherein the interface is a wireless interface.

8. The method according to claim 1, further comprising managing, by the hybrid network controller, quality of service for the communication of the information.

9. The method according to claim 1, further comprising allocating by the hybrid network controller, bandwidth for the communication of the information.

10. The method according to claim 1, further comprising allocating or deallocating by the hybrid network controller, resources utilized by the endpoint device, the femtocell, or the non-femtocell access point for the communication of the information.

11. The method according to claim 1, wherein the requirement comprises quality of service or bandwidth.

12. A hybrid network controller, comprising:
   a femtocell communications interface configured to communicatively couple the hybrid network controller with a femtocell;
   a non-femtocell access point communications interface configured to communicatively couple the hybrid network controller with a non-femtocell access point; and
   one or more circuits configured to:
      determine an access device to handle a communication request for an endpoint device based on a requirement of the communication request, wherein determining the device comprises choosing one of the femtocell and the non-femtocell access point,
      assign the determined access device to a communication request, and
      control communication of information between the endpoint device and the determined femtocell or non-femtocell access point.

13. The controller according to claim 12, wherein the one or more circuits are configured to communicate control information from the hybrid network controller to the endpoint device using the determined access device to enable the communication of the information.

14. The controller according to claim 13, wherein the one or more circuits are configured to enable the determined access device for the communication of the information based on the communicated control information.

15. The controller according to claim 12, wherein the one or more circuits are configured to manage the femtocell and the non-femtocell access point.

16. The controller according to claim 12, wherein the one or more circuits are configured to manage the communication of the information via the determined access device.

17. The controller according to claim 12, wherein the one or more circuits are configured to handle network traffic associated with the communication of the information between the endpoint device and the determined access device.

18. The controller according to claim 17, wherein the one or more circuits are configured to control an interface for the handling of the network traffic.

19. The controller according to claim 12, wherein the one or more circuits are configured to manage quality of service for the communication of the information.

20. The controller according to claim 12, wherein the one or more circuits are configured to allocate bandwidth for the communication of the information.

21. The controller according to claim 12, wherein the one or more circuits are configured to allocate or deallocate resources utilized by the endpoint device, the femtocell, or the non-femtocell access point for the communication of the information.

* * * * *

UNITED STATES PATENT AND TRADEMARK OFFICE
CERTIFICATE OF CORRECTION

PATENT NO.      : 9,025,534 B2
APPLICATION NO. : 12/470764
DATED           : May 5, 2015
INVENTOR(S)     : Karaoguz et al.

Page 1 of 1

It is certified that error appears in the above-identified patent and that said Letters Patent is hereby corrected as shown below:

Claims

Column 20, line 14, Claim 9, please replace "allocating by" with --allocating, by--

Column 20, line 17, Claim 10, please replace "deallocating by" with --deallocating, by--

Signed and Sealed this
Sixth Day of October, 2015

Michelle K. Lee
*Director of the United States Patent and Trademark Office*